United States Patent [19]

Albesano et al.

[11] Patent Number: 5,566,270
[45] Date of Patent: Oct. 15, 1996

[54] SPEAKER INDEPENDENT ISOLATED WORD RECOGNITION SYSTEM USING NEURAL NETWORKS

[75] Inventors: Dario Albesano, Pianezza; Roberto Gemello; Franco Mana, both of Turin, all of Italy

[73] Assignee: CSELT-Centro Studi E Laboratori Telecomunicazioni S.p.A., Turin, Italy

[21] Appl. No.: 238,319

[22] Filed: May 5, 1994

[30] Foreign Application Priority Data

May 5, 1993 [IT] Italy ................... TO93A0309

[51] Int. Cl.$^6$ ................................................ G10L 5/06
[52] U.S. Cl. .................... 395/2.41; 395/2.49; 395/2.5; 395/2.51; 395/2.64; 395/2.65; 395/2.62
[58] Field of Search ................... 395/2.41, 2.64, 395/2.65, 2.4, 2, 2.5, 2.49, 2.51, 2.6, 2.62; 381/41, 43

[56] References Cited

FOREIGN PATENT DOCUMENTS

| 2230370 | 10/1990 | United Kingdom | G10L 5/06 |
| 2240203 | 7/1991 | United Kingdom | G10L 5/06 |
| 2231698 | 11/1991 | United Kingdom | G10L 5/06 |

OTHER PUBLICATIONS

"Speaker Independent Recognition of Isolated Words Using Vector Quantization and Neural Networks", Ph.D. Thesis, by Ming Zhu, 1992, Berlin, Germany.

Primary Examiner—Kee Mei Tung
Attorney, Agent, or Firm—Herbert Dubno

[57] ABSTRACT

A speech recognition apparatus in which the speech signal is digitalized and subjected to special analysis, word end detection is effected by energy analysis of the speech signal and the recognition system utilizes a Markov model in combination with a neural network learning by specific training steps.

5 Claims, 4 Drawing Sheets

SPEAKER INDEPENDENT ISOLATED WORD RECOGNITION SYSTEM USING NEURAL NETWORKS

SPECIFICATION

1. Field of the Invention

The present invention relates to automatic speech recognition systems and, more particularly, to a speaker independent isolated word recognition system using neural networks.

2. Background of the Invention

It is well known that the supply of vocal services on a telephone fine requires the presence of equipment capable of recognizing at least a short dictionary, generally comprising some ten words pronounced separately one at a time by the user. It is also well-known that recognition on a telephone line entails additional difficulties with respect to normal recognition because of the poor quality of the audio signal, which is limited in bandwidth and is affected by noise introduced by the switching and transmitting equipment.

The recognition technique presently used is based on the so called Markov model, as described by D. B. Paul in "Speech Recognition Using Hidden Markov Models", The Lincoln Laboratory Journal, vol. 3, n. 1 (1990).

A Markov model, e.g. of the type described by L. R. Rabiner in the article "An introduction to Hidden Markov Models", IEEE ASSP Magazine, January 1986, is a stochastic automaton characterized by two types of parameters: the transition probabilities from one state to another of the automaton and the probabilities for each state of recognizing an input symbol, also called the emission probability of such a symbol.

When applied to speech recognition, the Markov model automaton structure is selected by setting a certain number of constraints due to the sequential nature of voice. So, only "left-to-right" automata are considered where after a state is abandoned it cannot be visited again and any transitions are limited to the recursion on one state and to the transition to the next state.

Complete words are thus modeled by left-to-right automata (with recursion on states) where each state corresponds to an acoustic word portion, which is automatically determined during training. The states of the different models are characterized by a probability of recognizing a portion of the input word.

Word recognition takes place by carrying out a dynamic programming according to Viterbi algorithm on all the automata, so as to find the path through the states maximizing the recognition probability by the automaton related to the examined word. The path detected is that of the minimum cost and the automaton where this path was found corresponds to the recognized word.

The Markov models have achieved satisfactory performances and now are the basis of many speech recognition systems. Top limits for the performances of this technique seem to have been attained and there is therefore a technical interest in attempting to improve recognition quality.

Moreover, in the case of continuous Markov models, where emission probabilities are computed with a linear density combination of gaussian probabilities in a number which generally varies from 8 to 16 per state, the computing effort can be very heavy.

OBJECT OF THE INVENTION

It is an object of the present invention to provide a hybrid system, comprising techniques already used for Markov models and neural network technology wherein word modeling with automata and decoding with dynamic programming, are retained as in Markov models, while emission probabilities are computed with neural networks and transition probabilities are computed in a different way, as it will be described later.

SUMMARY OF THE INVENTION

Neural networks are a distributed processing model reproducing in a simplified form the organisation of the cerebral cortex. A neural network is a parallel processing model made up of numerous processing units (neurons) strongly interconnected by means of connections with different intensifies (Synapses).

The activity of the individual unit is simply a non linear function of the weighted sum of inputs and model power is resident in the topology of the connections and in their intensity. Starting from the input units, to which data of the problem to be solved are supplied, processing is parallel distributed in the network till the output units supplying the result.

A neural network is not programmed, but it is trained by a set of examples of the reality to be modeled. Neural networks are described, for example, in the book by D. Rumelhart "Parallel Distributed Processing", vol. 1 Foundations, MIT Press, Cambridge, Mass., 1986.

This technology gives very good performances in many sectors such as function estimate, video and speech signal classification, industrial control techniques, forecast and optimization.

The aim of the hybrid recognition system, of the present invention, is to avail itself of the characteristics of neural networks, such as strength to noise, classification accuracy and parallel processing, in order to improve recognition and optimize the system as to time and memory, through some consolidated aspects of recognition techniques are kept, such as word modeling with automata and dynamic programming for decoding them.

The main advantages of the hybrid recognition system are as follows: increase in recognition accuracy, thanks to the use of contextual information and discriminant training typical of neural networks; a great potential efficiency, thanks to the intrinsic parallelism of the neural model, which can be implemented by special devices, such as vectorial processors, digital or analog VLSI chips for neural networks.

The speaker independent isolated word recognition system using neural networks as an apparatus in which the speech signal is digitized and submitted to spectral analysis at constant temporal intervals using fast Fourier transform, the analysis result is submitted to an orthogonal transformation to obtain cepstral parameters and the logarithm of the total energy contained in each temporal interval is calculated, obtaining the characteristic parameters of the speech signal for each temporal interval, the word ends are detected through the energy level of the signal and the word is analyzed by a recognizer (RNA), in which complete words are modelled with Markov model automata of the left-to-right type with recursion on the states, each of which corresponds to an acoustic portion of the word, and in which the recognition is carried out through a dynamic programming according to Viterbi algorithm on all automata for finding the one with the minimum cost path, which corresponds to the recognized word indicated at output (PR), the emission possibilities being calculate with a neural network with feedback specially trained and the transition probabilities being estimated in a suitable way, the training method is characterized by the fact that it comprises the following operations:

initialization:

a. initialization of the neural network with small random synaptic weights;

b. creation of the first segmentation by segmenting the training set words uniformly.

iteration:

1. initialization of the training set with all the segmented words;

2. random choice of a word not already learnt (a word is considered learnt if thee mean error for that word is sufficiently low);

3. updating of synaptic weights wij for the considered word by applying a correlative training; more particularly the neural network input is made to vary according to a window sliding from left to right on the word and for every input window a suitable objective vector is supplied at the output, constructed by setting a 1 on the neuron corresponding to the state to which the input window belongs, according to the current segmentation, and by setting 0 on all the other neurons;

4. segmentation recomputation for the considered word, by using the neural network trained until now, and performing a dynamic programming only with the correct model;

5. updating of the current segmentation $S_{i+1}$;

6. if there still are non considered words in the training set, go to step 2;

7. recomputation of transition probabilities of automata;

8. if the number of iterations on the training set is greater than a maximum preset number NMAX, terminate or otherwise to step 1.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
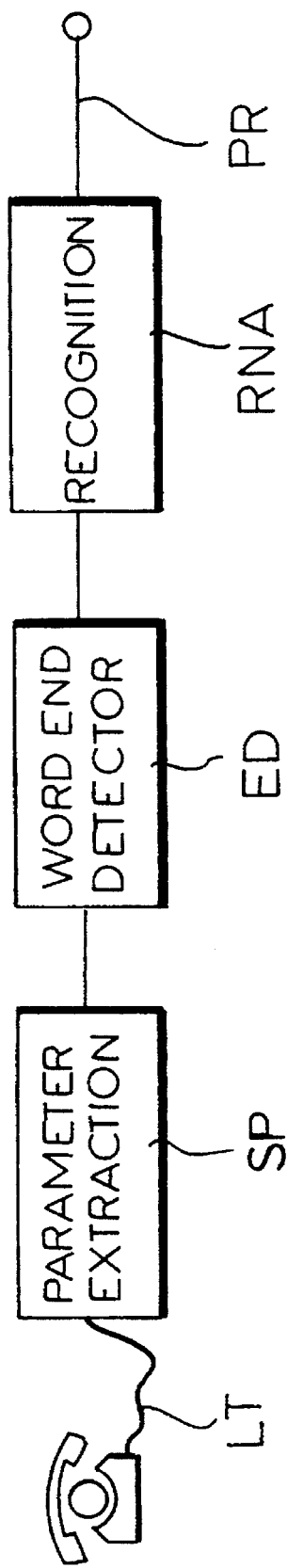
FIG. 1 is a block diagram of the system

The recognition system shown in FIG. 1 receives the speech signals at input made up of isolated words and any noises con:ting from a telephone line LT or from any analogic source and submits them to a sequence of operations.

The first operation, carried out by a module SP having known characteristics, allows the extraction of the parameters which characterize the speech signal. It consists of the signal spectral analysis carried out on critical bandwidths of the human auditory system. The signal is first digitized with a sampling rate of 8 KHz and analysed every 10 ms by the fast Fourier transform. The result of the spectral analysis is then submitted to an orthogonal transformation (Cosine transform) in order to obtain 12 so-called cepstral parameters. The logarithm of the total energy contained in each 10 ms temporal interval is moreover calculated. To these 13 values their numeric derivatives are added obtaining in all 26 parameters for each temporal interval.

The next module ED is an apparatus which detects approximately word ends, separating the word from the surrounding silence. The apparatus operates on the parameter related to the total energy of the speech signal supplied by the previous block and supplies a signal used to activate next block RNA. This is a recognizer based on the hybrid model of the present invention, and which will be described further on in detail. The indications about recognized words are present at output PR of block RNA.

The recognizer RNA is a hybrid model inheriting word modeling using left-to-right automata from the Markov model technique, while the emission probability of the states, i.e. the probability that a state recognises an input segment as belonging to it, is estimated by a multilayer perceptron type recurrent neural network.

Figure 2:
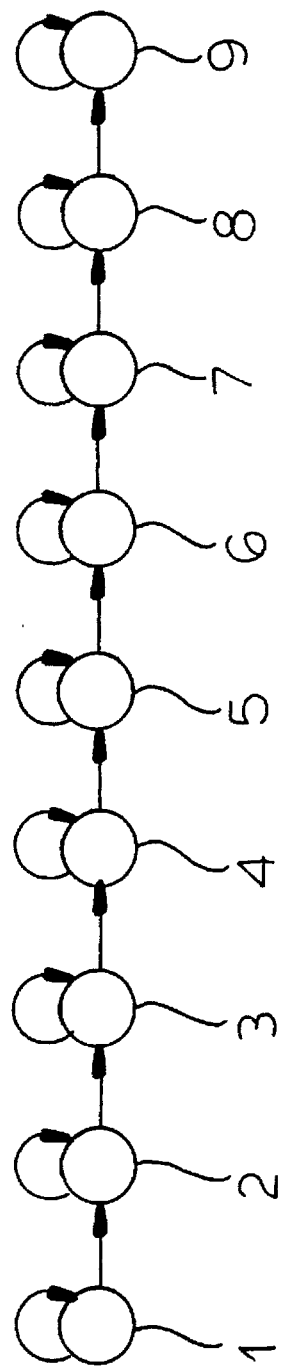
FIG. 2 shows the specific realization of the automata modelling complete words.

A specific embodiment of the automata modelling complete words to carry out recognition with the invention system is shown in FIG. 2.

To recognize isolated words, each word is made up of an automaton containing a central sequence of states belonging to the word, denoted by numbers from 3 to 7, preceded and followed by an initial silence state 2 and final 8, specific to the word, respectively containing the transition silence-word and word-silence.

During recognition other two genetic background noise states 1 and 9 are added at the beginning and end of the automaton to perceive wider silence portions surrounding the word and any hisses and spurious noises. As it can be noted in the figure, automaton states have a recursion on themselves besides the transition to the next state.

Figure 3:
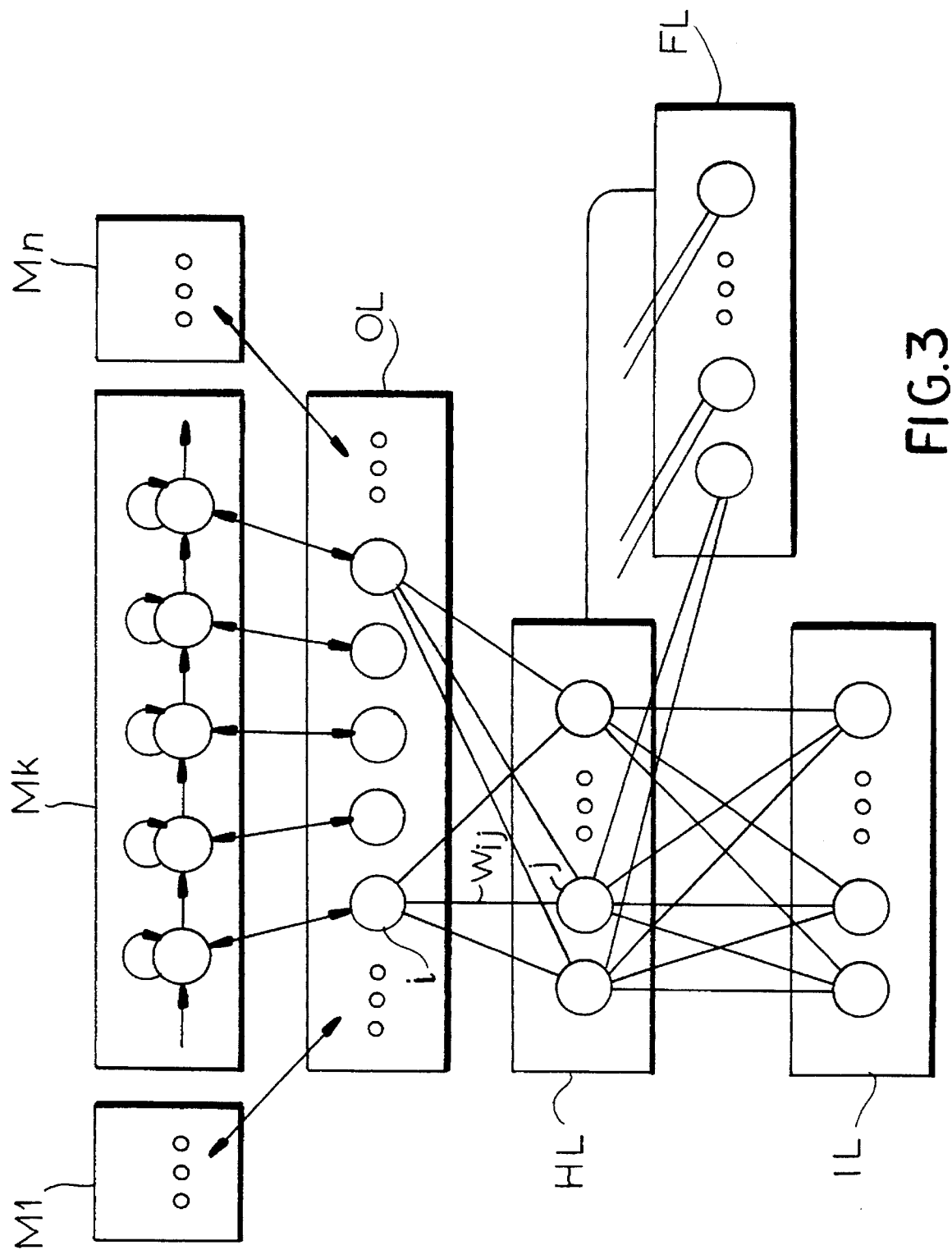
FIG. 3 is a diagram of the block denoted by RNA in FIG. 1.

In FIG. 3 block RNA is outlined, comprising a multilayer perceptron neural network, of the type described in the already mentioned book by D. Rumelhart "Parallel Distributed Processing", whose input is a window of the preprocessed speech signal, i.e. a window of cepstral parameters, and whose outputs are the emission probability of the states of all the word models denoted by M1, . . . , Mk, . . . , Mn.

The units of each level of the neural network are completely connected with the units of the preceding level through synaptic weights. Output $o_i$ of the individual neuron i is given by the weighted sum of its inputs $o_j$, to which a constant value $\theta_i$, typical of the neuron, is added. The sum is then submitted to a sigmoidal transformation F(x), according to the following formula:

$$o_i = F\left( \sum_j w_{ij} \cdot o_j + \theta_j \right) \text{ with } F(x) = \frac{1}{1+e^{-x}}$$

where $w_{ij}$ is the synaptic weight of the connection from neuron j to neuron i.

The neural network used in the present system is of the recurrent multilayer perceptron type, i.e. provided with feedback. The neural network comprises indeed a level FL which contains at the time t+1 the contents of the internal level HL at the time t. This contents returns at input at the internal level HL realizing therefore a system with feedback, capable of availing itself of a memory of the preceding states.

The input of block RNA, at level IL, is a window comprising 7 temporal intervals 10 ms each (a number of intervals from 3 to 9 is suitable) of the cepstral parameters supplied by the block ED (FIG. 1); it is followed by the level of the hidden units HL provided with feedback and by an output unit level OL, on which the suitably coded result is read. The output units are in a biuniform correspondence with the states of all automata M1, ..., Mn, used for modeling the words in the used dictionary.

The output of these units (ranging from 0 to and 1) gives an estimate of the emission probability of the state.

The presence of a window with an amplitude equal to seven 10 ms temporal intervals at neural network input allows to consider a part of the speech signal greater than that considered by the Markov models operating with a 10 ms amplitude window. This is an advantage because it makes recognition easier.

The presence of the feedback also allows to use a contextual information, by permitting to the neural network to 'remember' the parts of the word already analysed to make recognition of the sounds under test easier. More particularly, the probability of emission of a state does not depend only on the current input but also on the inputs of the preceding instants. This can be very useful in discriminating similar sounds found in different words (such as 'E' in 'DUE' and 'E' in TRE) or in the same word (such as the two 'O' in OTTO), but in different contexts. For example, the contextual information makes the state corresponding to the 'O' of 'ZERO' be activated only in this context and not whenever there is an input of the sound 'O' as in 'UNO', 'NOVE', etc.

Figure 4:
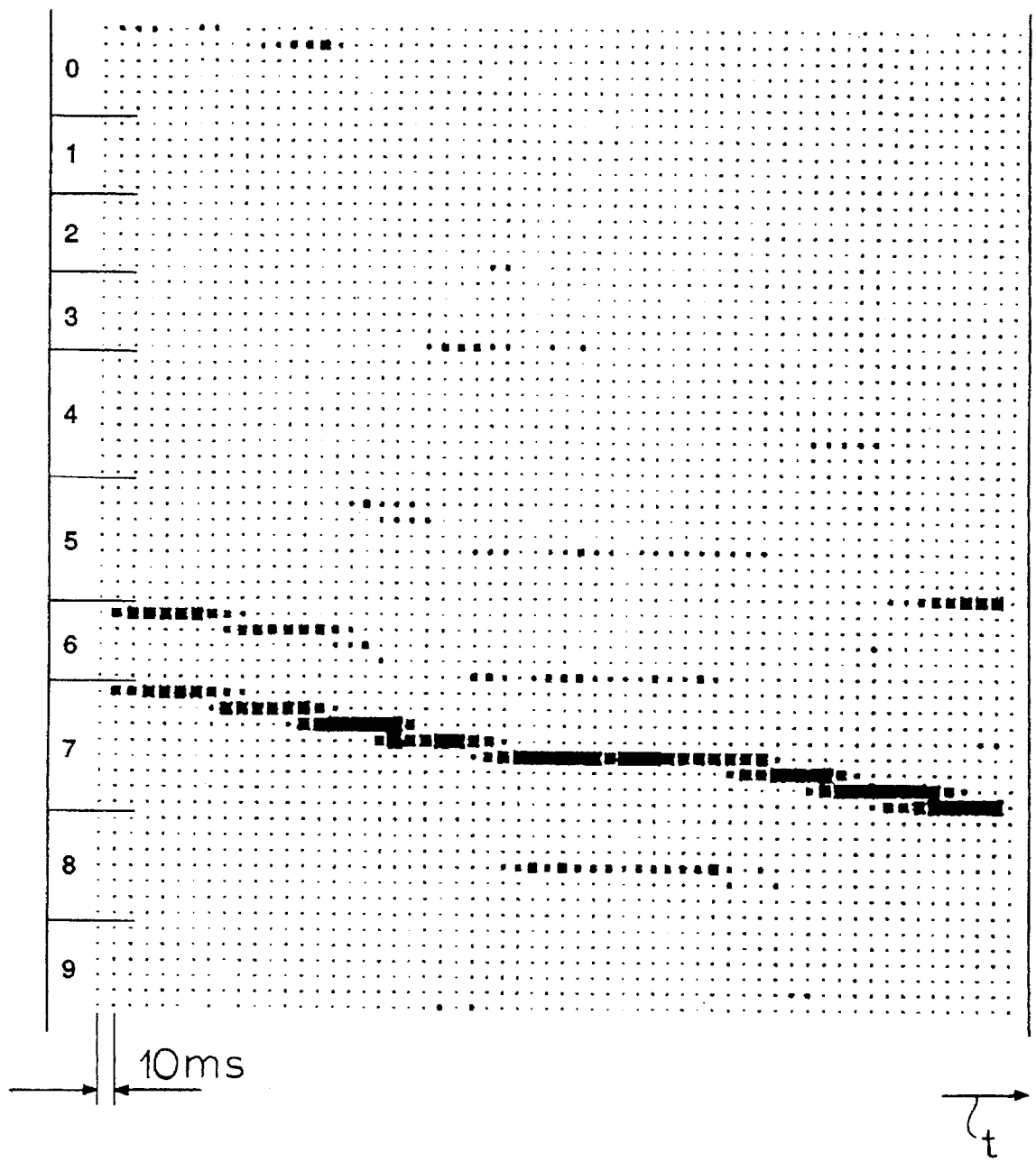
FIG. 4 is an example of emission probabilities for all the states of the automata relating to the ten italian digits ('ZERO', . . . , 'NOVE') in the presence of the word 'SETTE'.

For a better understanding see FIG. 4, showing the activation of output neurons in an already trained neural network operating in word recognition ('SETTE' in the example).

On the ordinates there are the states of the 10 automata, corresponding to the pronounciation of digits from 'ZERO' to 'NOVE', each comprising a number of states between 5 and 8, shown in a succession from top to bottom. On the abscisses is shown the time, divided into a number of 10 ms temporal intervals. The size of dots is directly proportional to the probability values, estimated by the neural network.

It can be seen that besides the states of the correct automaton in the word 'SETTE' only the first states of the automaton 'SEI' are activated while the states of the other automata are practically disactivated, i.e. they have practically no probability even though these automata contain sounds present in 'SETTE', such a 'E' or 'T'.

Recognition system training, based on a set of already classified training words, must be performed before that the system be used for the recognition. During the training stage the block RNA must perform two operations at the same time: one consists in detecting a suitable segmentation for each word, attributing to each automaton state modelling the word a certain word portion; the other consists in training the neural network to correctly recognize word portions assigned to the different states, emitting in this case a high probability for correct state and a low one for the others. As known, the word segmentation is the vector of state end points. For example, the segmentation $S_t=(6\ 10\ 18\ 22\ 30)$ corresponds to a word modelled by a 5 state automaton, the first of which has taken the first six 10 ms temporal intervals of the word, the second the intervals from 7 to 10, the third the intervals from 11 to 18, and so on.

The training is partly realized according to already known methods, but it contains variants and additions characterizing the invention producing a useful operation of the training itself. In this way the neural network can be used for recognizing isolated words with good performances.

The training of the neural network consists in modifying the weights $w_{ij}$ of the network in order to realize the correct input-output transfer function based on a pair set <input vector, output vector> called training set. Input vectors are composed of segmented words and recorded in the form of cepstral parameters, collected in a data base with optimum characteristics for training. Output vectors, herein called objective vectors, are suitably constructed, as described further on. When the training is over, the synaptic weights obtained are stored in a memory and are used for recognizing the words received from the telephone line.

Figure 5:
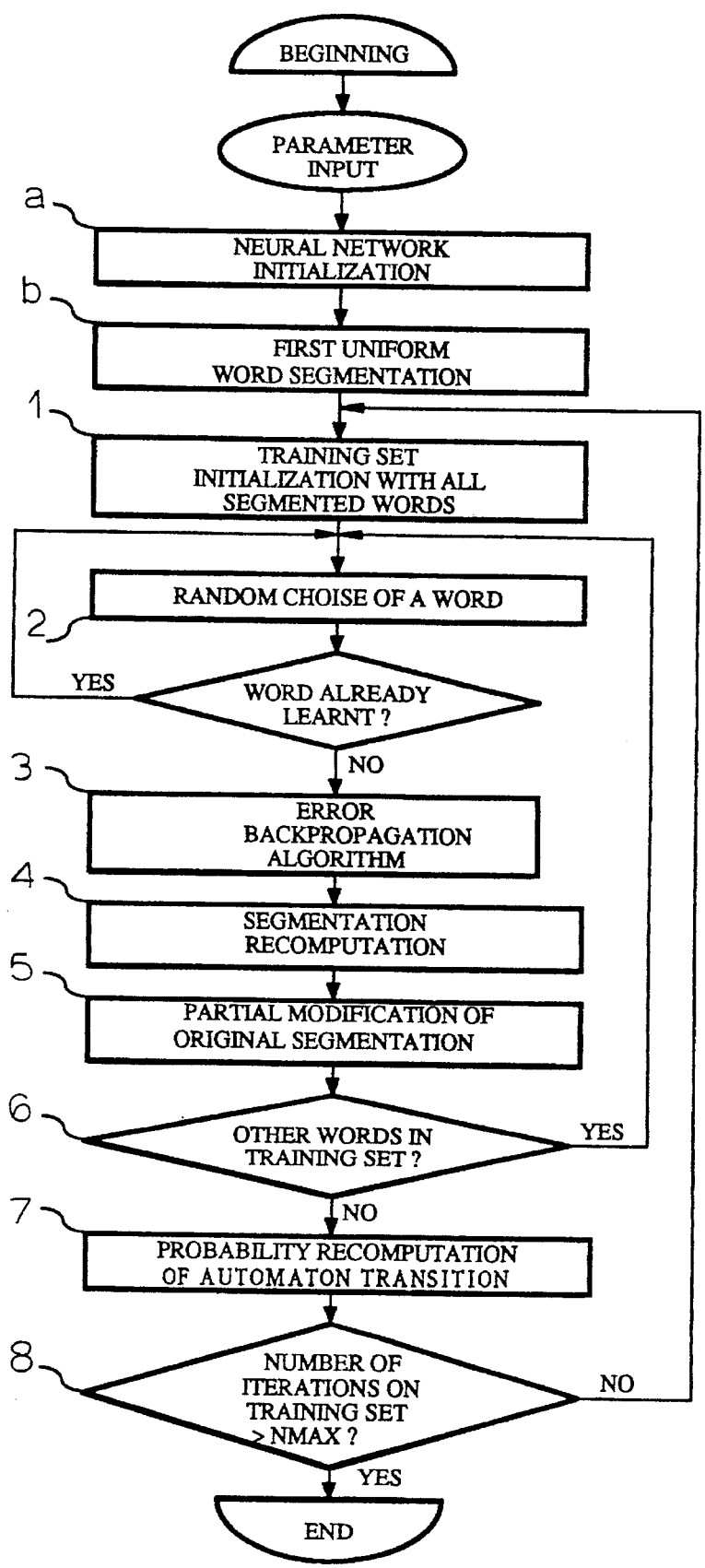
FIG. 5 is a flow chart of the operations necessary for training the recognition system object of the present invention.

The training method stages of block RNA, shown in the flow chart in FIG. 5, are the following:

initialization:

a. initialization of the neural network with small random synaptic weights;

b. creation of the first segmentation by segmenting the training set words uniformly.

iteration:

1. initialization of the training set with all the segmented words;

2. random choice of a word not already learnt (a word is considered learnt if the mean error for that word is sufficiently low);

3. updating of synaptic weights $w_{ij}$ for the considered word by applying the error backpropagation algorithm, suitably modified as described in detail further on; more particularly, the neural network input is made to vary according to a window sliding from left to right on the word and for every input window a suitable objective vector is supplied at output. This objective vector is constructed by setting a 1 on the neuron corresponding to the state to which the input window belongs, according to the current segmentation, and by setting 0 on all the other neurons;

4. segmentation recomputation for the considered word, by using the neural network trained until now, and performing the dynamic programming only with the correct model;

5. updating of the current segmentation $S_{t+1}$ according to an equation described further on;

6. if there still are any non considered words in the training set, go to step 2;

7. recomputation of transition probabilities of automata, as will be described later;

8. if the number of iterations on the training set is greater than a preset maximum number NMAX it ends, otherwise it goes to step 1.

The construction of objective vectors, based on word segmentations and segmentation updating, are realized by an auxiliary part of the learning algorithm. More particularly, segmentations are partly modified at each iteration in the following way. Assuming $S_t$ as the segmentation of a word in the time t, $S_{t+1}$ the segmentation at the next iteration and $S'_t$ the segmentation of the same word recomputed by the neural network trained until now (step 4), if $S_t(k)$ is the k-th element of the segmentation at time t, at next time t+1 it is changed according to the formula:

$$S_{t+1}(k) = S_t(k) + \text{round}[\alpha(S'_t(k) - S_t(k))]$$

where the round function rounds up the argument to the nearest integer and α goes from ε to 1−ε following the sigmoidal law:

$$\alpha = \frac{1}{1 + e^{\frac{-t+\upsilon}{T}}}$$

with $$T = \frac{N-1}{\log \frac{(1-\varepsilon)^2}{\varepsilon^2}}$$

$$\upsilon = \frac{N+1}{2}$$

where t is the current time (number of iterations on the training set), N is the number of iterations of the training set where parameter α is to be varied and ε, 0<ε<0.5, is the variation range of α.

Another possibility consists in having α increasing according to a linear law.

These methods involve a slow variation of the segmentation, so that there is a gradual evolution from the uniform initial segmentation to the correct segmentation, following at the same time the training of the neural network. This method is useful for a good result of the training of the recognition system.

For what concerns modification of weights, the present invention foresees the use of an algorithm similar to that called "error backpropagation", described by Rumelhart in the mentioned book, which uses the difference between the desired output and the real output, i.e the error, for modifying network weights so as to minimize such error. The type of training using this modified algorithm will be hereafter called Correlative Training.

In general, if there were more classes to discriminate and a sample at input, the output of the correct class was set at 1 for the sample and at 0 for all the other ones. This was admissible when all the classes were well separated. This is not however what happens in the present case since, for example, there can be different states corresponding to the same sound, in different words (e.g. S-E in SEI and in SETTE). Thus it is possible that the same input has to activate more states at the same time. To do this it is necessary to modify the strictly discriminant training of the neural networks per classification, providing that only one class (state) should be active at a time. The Correlative Training allows highlighting the correlations naturally existing between word states, trying to discriminate them as much as possible, without however insisting when this becomes difficult, since this would imply the creation of ill formed states or the reciprocal cancellation of states too similar to one another.

Going into a greater detail, the Correlative Training provides to modify the standard algorithm of the error backpropagation according to the following steps:

For each sample of the training set:
1. consider input value vector X and desired value vector T (objective vector);
2. position input values on input units;
3. execute the network by forward propagating said values from input units up to output units, and obtain output vector 0, according to the well known formulas:

$$o_i = F(net_i) \text{ with}$$

$$net_i = \sum_j w_{ij} + \theta_j, \quad F(x) = \frac{1}{1 + e^{-x}}$$

where $o_i$ is the output of a generic neuron i and $\theta_j$ is a constant value, typical of the neuron;

4. calculate error E, defined as square error between output vector O and desired vector T, according to the formula:

$$E = \sum_k (t_k - o_k)^2$$

where the objective is defined according to the correlation formula of outputs:

$$t_k = o_k \cdot o_h \text{ if } t_k \neq 1 \text{ and } t_h = 1$$

$$t_k \text{ unvaried if } t_k = 1$$

where $t_k$ is the k-th element of the objective vector, and $o_k$ and $o_h$ are the outputs of the k-th and h-th neuron of the output level of the network.

5. calculate the partial derivative $$\frac{\partial E}{\partial w_{ij}}$$

of the error with respect to weights, used in the updating equation of synaptic weights $$\Delta w_{ij}(t) = -\eta \frac{\partial E}{\partial w_{ij}} + \beta \Delta w_{ij}(t-1) = \eta \delta_i o_j + \beta \Delta w_{ij}(t-1)$$

where $w_{ij}$ is the synaptic weight from neuron j to neuron i, η is a coefficient determining learning speed, β is a coefficient, called moment, determining the inertia in weight updating, $\delta_i$ is the backpropagated error on neuron i and $o_j$ is the output of neuron j. Starting from the error defined at step 4, the new backpropagation error laws for Correlative Training are obtained, defined as follows:

for output neurons:

$$\delta_i = (t_i - o_i) F'(net_i) \text{ if } t_i = 1$$

$$\delta_i = -o_i(o_h - 1)^2 F'(net_i) \text{ if } t_i \neq 1 \; t_h = 1$$

for internal neurons:

$$\delta_i = \left( \sum_k \delta_k w_{ik} \right) F'(net_i)$$

where index k moves on neurons of the upper level.

6. update every synaptic weight $w_{ij}$, according to the already described equation:

$$\Delta w_{ij}(t) = -\eta \frac{\partial E}{\partial w_{ij}} + \beta \Delta w_{ij}(t-1) = \eta \delta_i o_j + \beta \Delta w_{ij}(t-1)$$

This variation of the error backpropagation algorithm for realizing the Correlative Training is a part of the present invention and is necessary to execute usefully the training stage of the recognition system.

Another important characteristic of the recognition hybrid system is the method for modeling transition probabilities of automaton states. The aim of the proposed method provides modeling only minimum durations of the states according to the well set hypothesis that speech phenomena have a minimum duration given by the mechanical limits of the anatomic devices producing them; maximum durations are however highly variable since they are a function of speed of speech depending on the personal characteristics and on the emotional situations of the speaker. Purpose of modelling of the minimum durations of the states is to improve recognition, preventing the best path of an automaton from remaining too short a time in a state corresponding to an acoustic phenomenon requiring in any case a certain duration in time.

As shown in FIG. 2, automaton states modeling the words have a recursion on themselves and a transition to the next state. The recursion probability can model maximum durations, since it acts on the permanence into the state. Since modelling of maximum durations is not required, the recursion probability is set at 1. The transition probability can model minimum durations, since it operates on the output from the state. A transition probability dependent on the time of permanence into the state is used to model minimum durations. To do this we introduce a parameter K indicating maximum number of permanences into a state for which transition probabilities are calculated. A reasonable value of K can range from 2 to 6.

Transition probability in the state i+1 of the word w at time t+1, given that it is in the state i at the time t, expressed as $P_T(S_{w,i+1}(t+1)|S_{w,i}(t))$, depends on the state to which it is associated or by the time of permanence into the state; $S_{w,i}$ is the state i.

$$P_T(S_{w,i+1}(t+1)|S_{w,i}(t)) = \min\left(\frac{1 - P_T(S_{w,i}(t+1)|S_{w,i}(t))}{P_T(S_{w,i}(t+1)|S_{w,i}(t))}, 1\right)$$

where min is the function which gives back the minimum between the considered fraction and 1, and $$P_T(S_{w,i}(t+1)|S_{w,i}(t)) = 1 \quad se \ t > K$$

$$P_T(S_{w,i}(t+1)|S_{w,i}(t)) = \frac{\sum_{h=t+1}^{\infty} Freq(S_{w,i}(h))}{\sum_{h=t}^{\infty} Freq(S_{w,i}(h))}$$

if t<K

In this last equation $Freq(S_{w,i}(h))$ is the number of words which remain in $S_{w,i}$ for h times.

Transition probabilities so formulated are calculated for each state of each word model, during the training stage of the recognition system, and are used usefully during the operation of the system improving its recognition performances.

It is well known how the learning algorithm parameters of the neural network (error backpropagation) are very sensitive, and that it is necessary to suitably calibrate them.

When training the neural network part of the recognition system, the following parameters can be advantageously used:

moment $\beta = 0.2$;

number of corrections accumulated before they are actually applied to weights (batchsize)=10;

learning speed $\eta$ linearly decreasing from 0.1 to 0.001.

It is clear that what described has been given only by way of non limiting example. Variations and modifications are possible without going out of the scope of the claims.

We claim:

1. A speaker independent isolated word recognition apparatus, comprising:

digitizing means for digitizing a speech signal and subjecting the digitized speech signal to spectral analysis at constant temporal intervals using fast Fourier transform, to obtain an analysis result;

means connected to said digitizing means for subjecting the analysis result to an orthogonal transformation to obtain cepstral parameters and a logarithm of a total energy contained in each temporal interval to yield characteristic parameters of the speech signal for each temporal interval;

means for detecting word ends through an energy level of the respective speech signal; and a recognizer (RNA), in which complete words are modelled with Markov model automata of a left-to-right type with recursion on states, each of which corresponds to an acoustic portion of the word, and in which the recognition is carried out through a dynamic programming according to a Viterbi algorithm on all automata for finding one with a minimum cost path, which corresponds to the recognized word indicated at output (PR), emission possibilities being calculate with a neural network with feedback having parallel processing neurons, the neural network being trained by:

initialization:

a. initialization of the neural network with small random synaptic weights;

b. creation of a first segmentation by segmenting a training of set words uniformly;

iteration by:

initialization of the training set with all the segmented words;

random choice of a word not already learned;

updating of synaptic weights $w_{ij}$ for a word by applying a correlative training by varying a neural network input according to a window sliding from left to right on the word and supplying for every input window a suitable objective vector at an output, constructed by setting a 1 on the neuron corresponding to a state to which the input window belongs, according to the segmentation, and by setting 0 on all the other neurons;

segmentation recomputation for the considered word, by using the neural network as previously trained, and performing a dynamic programming only with correct model;

updating of the segmentation $S_{t+1}$;

if there still are non considered words in the training set, repeat the random choice;

recomputation of transition probabilities of automata; and if the number of iterations on the training set is greater than a maximum preset number NMAX, terminate or return to initialization of the training set.

2. The apparatus defined in claim 1, wherein the neural network is a network trained on the following steps, repeated for each sample of the training set:

1. consider input value vector X and desired value vector T (objective vector);

2. position input values on input units;

3. execute the network by forward propagating said values from input units up to output units, and obtain output vector O by $o_i = F(net_i)$ with -continued $$net_i = \sum_j w_{ij} + \theta_j, F(x) = \frac{1}{1+e^{-x}}$$

where $o_i$ is the output of a generic neuron i and $\theta_i$ is a constant value, typical of the neuron;

4. calculate error E, defined as square error between output vector O and desired vector T, according to the formula:

$$E = \sum_k (t_k - o_k)^2$$

where the objective is defined according to the correlation formula of outputs:

$$t_k = o_k \cdot O_n \text{ if } t_k \neq 1 \text{ and } t_h = 1$$

$$t_k \text{ unvaried if } t_k = 1$$

where $t_k$ is the k-th element of the objective vector, and $o_k$ and $o_h$ are the outputs of the k-th and h-th neuron of the output level of the network;

5. calculate a partial derivative $$\frac{\partial E}{\partial w_{ij}}$$

of the error with respect to weights, used in updating of synaptic weights $$\Delta w_{ij}(t) = -\eta \frac{\partial E}{\partial w_{ij}} + \beta \Delta w_{ij}(t-1) = \eta \delta_i o_j + \beta \Delta w_{ij}(t-1)$$

where $w_{ij}$ is the synaptic weight from neuron j to neuron I, $\eta$ is a coefficient determining learning speed, $\beta$ is a coefficient, called moment, determining an inertia in weight updating $\delta_i$ is the backpropagated error on neuron I and $o_j$ is the output of neuron j; starting from the error defined at step 4 new backpropagation error laws for correlative training are obtained, defined as follows:

for output neurons:

$$\delta_i = (t_i - o_i) F'(net_i) \text{ if } t_i = 1$$

$$\delta_i = -o_i(o_h - 1)^2 F'(net_i) \text{ if } t_i \neq 1 \ t_h = 1$$

for internal neurons:

$$\delta_i = \left( \sum_k \delta_k w_{ik} \right) F'(net_i)$$

where index k moves on neurons of the upper level;

6. Update every synaptic weight $w_{ij}$, according to the equation:

$$\Delta w_{ij}(t) = -\eta \frac{\partial E}{\partial w_{ij}} + \beta \Delta w_{ij}(t-1) = \eta \delta_i o_j + \beta \Delta w_{ij}(t-1).$$

3. The apparatus defined in claim 2 wherein the neural network has the following parameters:
moment $\beta = 0.2$;
number of corrections which are accumulated before they are actually applied to weights (batchsize)=10;
learning speed $\eta$ linearly decreasing from 0.1 to 0.001.

4. The apparatus defined in claim 1 wherein said neural network has a transition probability in the state I+1 of the word w at the time t+1, where the transition probability in the state I at the time t, is calculated in the following way:

$$P_T(S_{w,i+1}(t+1)|S_{w,i}(t)) = \min\left( \frac{1 - P_T(S_{w,i}(t+1)|S_{w,i}(t))}{P_T(S_{w,i}(t+1)|S_{w,i}(t))}, 1 \right)$$

where min is the function which gives back the minimum between the considered fraction and 1, and $$P_T(S_{w,i}(t+1)|S_{w,i}(t)) = 1 \quad se \ t > K$$

$$P_T(S_{w,i}(t+1)|S_{w,i}(t)) = \frac{\sum_{h=t+1}^{\infty} Freq(S_{w,i}(h))}{\sum_{h=t}^{\infty} Freq(S_{w,i}(h))}$$

If t<K where, in this last equation $Freq(S_{w,i}(h))$ is the number of words which remain in $S_{w,i}$ for h times.

5. The apparatus defined in claim 1 wherein each word is modeled by an automaton containing a central sequence of states belonging to the word (3 . . . , 7), preceded and followed by an initial (2) and final (8) silence state specific of the word, which respectively contain silence-word and word-silence transitions, in their turn preceded and followed by two further states of generic background noise (1, 9).

\* \* \* \* \*